United States Patent [19]
Phelps et al.

[11] 3,877,908
[45] Apr. 15, 1975

[54] AIR FILTER ASSEMBLY WITH A CONTROLLED AUXILIARY AIR INLET

[75] Inventors: Harold E. Phelps, Plymouth, Mich.;

[73] Assignee: Harold Phelps, Inc., Plymouth, Mich.

[22] Filed: Mar. 19, 1974

[21] Appl. No.: 452,535

[52] U.S. Cl. .................. 55/419; 55/510; 137/540
[51] Int. Cl. .............................................. B01d 27/08
[58] Field of Search ............ 55/419, 510, 312–314, 55/418; 123/139, 119 D, 119 DB; 137/540, 538

[56] References Cited
UNITED STATES PATENTS

| | | | |
|---|---|---|---|
| 1,495,495 | 5/1924 | Naylor | 137/526 |
| 2,428,117 | 9/1947 | Kanuch | 137/494 |
| 3,077,715 | 2/1963 | Carroll | 55/310 |
| 3,452,521 | 7/1969 | Remacle | 55/419 |
| 3,481,119 | 12/1969 | McKinlay | 55/419 |
| 3,513,817 | 5/1970 | Kearsley | 55/419 |
| 3,612,024 | 10/1971 | Bandimere | 55/510 |
| 3,710,560 | 1/1973 | Maddocks | 55/419 |
| 3,741,179 | 6/1973 | Vartanian | 55/419 |

FOREIGN PATENTS OR APPLICATIONS

| | | | |
|---|---|---|---|
| 884,652 | 3/1943 | France | 137/538 |

*Primary Examiner*—Bernard Nozick
*Attorney, Agent, or Firm*—Hugh L. Fisher

[57] ABSTRACT

An air filter assembly for a vacuum source, such as an internal combustion engine or the like that requires air for operation, which filter assembly is provided with a filter element for the air and an enclosure for the filter. The enclosure has an inlet for reception of the ambient air which passes through the filter element and then through an outlet in the enclosure to the vacuum source. Air valve apparatus is carried by the enclosure to provide a controlled auxiliary inlet for additional air and is arranged to open when air suction reaches a certain value corresponding to that when additional air is wanted to achieve increased efficiency; e.g., when an internal combustion engine is under heavy load or accelerating rapidly. Under these circumstances, the air valve apparatus admits the additional air, which also passes through the filter element to the enclosure outlet. The air valve apparatus has a self-cleaning provision that prevents the apparatus from becoming inefficient or even inoperative. In another embodiment, the air valve apparatus can be operated by the engine vacuum; e.g., the vacuum in the engine intake manifold or the vacuum downstream from the throttle valve in the usual internal combustion engine carburetor.

22 Claims, 10 Drawing Figures

AIR FILTER ASSEMBLY WITH A CONTROLLED AUXILIARY AIR INLET

This invention relates to improvements in air filter assemblies.

In air filter assemblies of the type employed with vacuum sources of various types; for example, an internal combustion engine or any other type of well known engine or prime mover that requires air, the incoming air is filtered by a filter element which conventionally includes some type of fibrous filter material that permits the passage of air therethrough relatively unimpeded but restricts the passage of dirt and other particles of foreign materials. Each filter assembly conventionally includes the filter element and an enclosure for it. Usually, to meet predetermined emissions requirements, the filter assembly enclosure has a part of the engine's emission system a predetermined inlet area for supplying air through the filter element and by way of the outlet and the carburetor to the engine. When engine demand is increased as during rapid acceleration or when operating under substantial loads, the air demand is increased but this air must flow through this same inlet area and if inadequate, there can be a reduction in the engine efficiency, which results in undesired consequences including a decrease in gas mileage; i.e., miles per gallon obtained. Any attempt to overcome this problem so as to increase engine efficiency is complicated by other related problems including the restrictions on disabling the present emission systems, the desire not to increase the emission of objectionable gases and to continue filtering all of the incoming air so that no dirty air, which is expected on dusty roads as well as during normal driving, will not enter either the carburetor and the engine and cause problems or increase the emission of unwanted gases.

With the foregoing in mind, there is contemplated a new and different air filter assembly with a controlled auxillary air inlet that automatically in response to demand for additional air admits such to the filter assembly and also that requires this additional air to pass through the filter assembly's filter element to insure that unfiltered air does not bypass the filter element and thereby enhances the operating efficiency of a related vacuum source.

Also contemplated is an air filter assembly having a unique controlled auxillary air inlet incorporating air valve apparatus that is adapted to open when an associated vacuum source's air demands exceed a certain amount.

Another object of the invention is the provision of an air filter assembly that incorporates novel air valve apparatus that is responsive to the air suction from an internal combustion engine or the like and opens, when the air suction increases to a predetermined value either when increasing acceleration or the load to admit additional air that passes through the filter element to the outlet of the filter assembly, thereby enabling increased operating efficiency to be obtained in the form of increased gas mileage but without perceptibly affecting the prior engine emissions content.

Another objective of the invention is to provide such an air valve apparatus which is responsive to a suction pressure in an engine intake manifold or structures proximate thereto where the vacuum decreases either with an increased load or increased acceleration so as to facilitate obtaining increased gas economy.

Another object of the invention is the provision of a unique air valve apparatus that has a housing that is supported by the filter assembly and has an enlarged inlet opening which decreases in area so as to provide a venturi effect for facilitating the rapid entrance of air to the filter assembly.

Also an objective is the provision of air valve apparatus having a housing that is supported by a filter assembly and has an enlarged inlet that reduces in area so as to provide a venturi effect and has the valve element slidable therein between an open position and a closed position relative to a series of air outlet openings in the periphery of the housing. A related objective is the provision of a valve element that is shaped to aid in filtering the incoming air so as to maintain the air valve apparatus relatively clean.

Also contemplated is air valve apparatus for a filter assembly having a valve element and a control arrangement for maneuvering the valve element between closed and open positions when predetermined air demand conditions exist.

Further contemplated is air valve apparatus that is easily installed without the need for any special expertise. A related objective is the provision of simple tools that virtually anyone can easily utilize to install the air valve apparatus on the filter assembly enclosure with the enclosure inplace on its related vacuum source.

The foregoing and other objects and advantages of the invention will become apparent from the following description and from the accompanying drawings in which.

Figure 1:
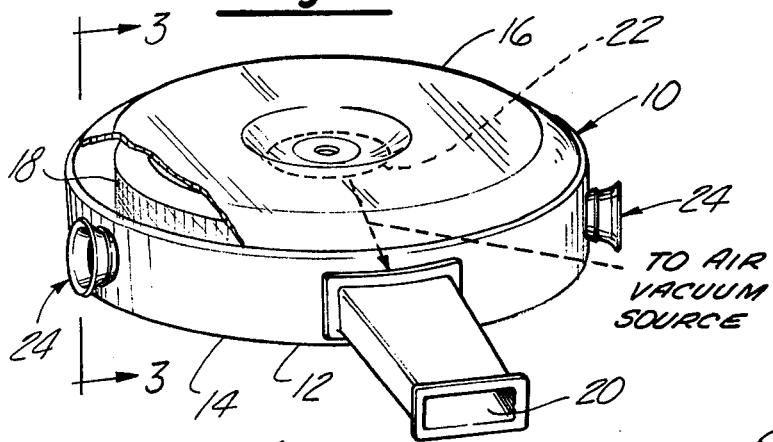
FIG. 1 is a perspective view, with a part broken away, of an air filter incorporating the principles of the invention.

Referring first to FIG. 1, the numeral 10 denotes an air filter assembly of the type that can be installed on an internal combustion engine carburetor inlet somewhat as is shown in U.S. Pat. No. 3,747,903 issued July 24, 1973, and entitled Fuel Supply System. The air filter assembly 10 includes an enclosure 12 having a bottom 14 that fits on the carburetor (not shown) and a removable top cover 16. Within the enclosure 12 is installed a filter provision, which in this instance is a ring shaped filter element 18 made of a suitable fibrous material that permits the passage of air therethrough with a minimum of restriction but resists and collects dirt and foreign material so that it does not enter into the carburetion system and the engine and produce clogging and resultant malfuntioning. The enclosure 12 has a tube like air inlet 20 through which air is drawn by the suction, or as it will be referred to from time to time air suction, from the internal combustion engine (not shown). This air then passes through and is filtered by the filter element 18 and then proceeds through an exit or outlet 22 to the carburetor. During periods when the air requirements are substantially increased, such as during increased acceleration or when increasing engine loads, the air filter assembly 10 can incorporate controlled auxiliary air inlets in the form of an air valve apparatus denoted generally at 24. One or more of these air valves apparatuses 24 can be employed during by engine size and auxilliary air requirements, to open and admit additional air, which additional or auxiliary air also is required to pass through the filter element 18.

Figure 3:
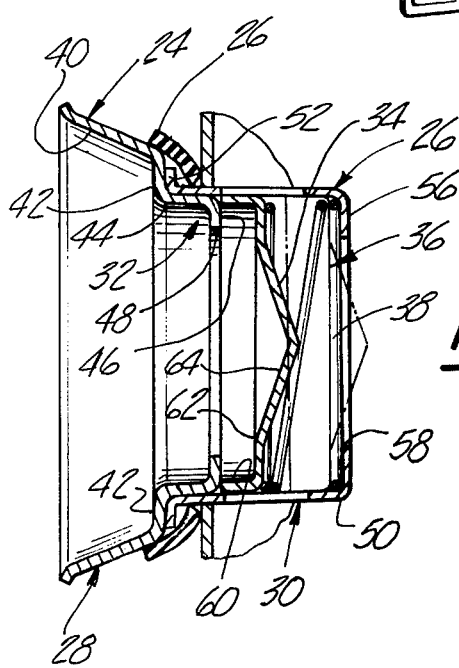
FIG. 3 is a sectional view of the air valve apparatus taken along line 3—3 in FIG. 1.

Referring next to FIG. 3 for the details of one embodiment of the air valve apparatus 24, the numeral 26 denotes generally a housing comprising an enlarged section 28, a valve section 30 and an intermediate reduced section 32. Slidably mounted in the valve section 30 is a valve element 34. This valve element 34 is movable between the solid line closed position and the broken line open position as determined by a control designated generally by the numberal 36. In this embodiment the control 36 utilizes a coil spring 38 in a way to be explained.

Considering first the enlarged section 28, this section includes a large bell or cone shaped portion 40 that tapers inwardly to a stop flange 42. This stop flange 42 then terminates in the reduced section 32.

The reduced section 32 has a cylindrical portion 44 and an inwardly extending end flange 46. This end flange 46 defines an opening 48 of a smaller diameter than that of the cylindrical portion 44.

Figure 2:
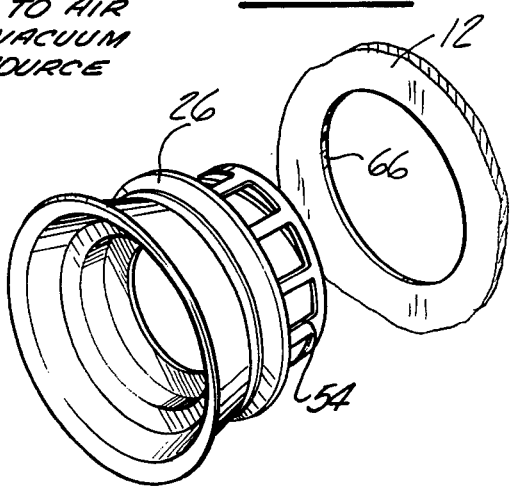
FIG. 2 is a perspective view of an air valve apparatus shown prior to its installation in an opening therefor formed in an enclosure for the filter assembly.

The valve section 30 has a cup shaped portion 50 that fits snugly on the cylindrical portion 44 and is provided at one end with an outwardly extending flange 52 that engages stop flange 42. The portion 50 has in the periphery thereof a series of spaced apart slots or air outlets 54 as shown in FIG. 2. The opposite end of the cup shaped portion 50 has an inwardly extending flange 56 defining an end opening 58 of a smaller diameter than the cylindrical portion 44.

The cup shaped portion 50 of the valve section 30 fits on the cylindrical portion 44 of the reduced section 32 and is held in position in any appropriate way; e.g., by a press fit or the cup shaped portion 50 can be suitably staked to the cylindrical portion 44. The control 36 for the valve element 34 includes a compression type coil spring 38 which is stalled in the valve section 30 between the valve element 34 and the inwardly extending flange 56 on to the cup shaped portion 50. The coil spring 38 urges the valve element 34 from the depicted broken line open position to the solid line closed position, in which the passage of air from the bell shaped opening 40 to the air outlets 54 is prevented.

The housing 26, therefore, provides an internal through opening to the filter element 18 commencing with the external opening provided by the bell shaped portion 40, which decreases in area to the cylindrical portion 44 of the reduced section 32 and then by way of the cylindrical portion 50 of the valve section 30 and past the valve element 34 in its broken line position and out the outlet openings 54. This change of areas from the bell shaped portion 40 to the cylindrical portion 44 generates a venturi effect which facilitates the entrance of air and increases the velocity at the reduced area in section 32. This increased velocity also aids in cleaning of the air valve apparatus as will be explained further.

The valve element 34 and again reference is made to FIG. 3, has an annular portion 60 and a closed end 62 provided with a domed portion 64. The valve element annular portion 60 is freely slidably within the interior of the valve section cylindrical portion 50 so as to avoid any interference with its free movement. Also the annular portion 60 engages the inwardly extending end flange 46 on the reduced section 32 which provides a stop for the valve element 34 in its illustrated closed position.

In operation, when the suction created by the engine increases indicating a demand for additional air, such as during acceleration or when the engine load is increased, then the control 36 will become effective being calibrated so that in this FIG. 3 embodiment the coil spring 38 will be compressed by the action of the suction on the valve element 34, and the valve element 34 will move to the broken line open position so that air can enter the bell shaped portion 40 of the enlarged section 28. This entering air will continue by way of the cylindrical portion 44 of the reduced section 32 where the mentioned venturi effect occurs, then exits through the air openings 54 in the valve section 30. This venturi effect and the annular portion 60 on the valve element together facilitate air movement at a high velocity and also what is believed to be a "twirling" effect around the valve element annular portion 60 and dome portion 64 so that dirt does not collect on the inside of the housing 26. Hence, the venturi effect and the so-called twirling effect from the valve element's annular portion 60 and the dome portion 64 combine to provide a self-cleaning air valve apparatus.

Figure 4:
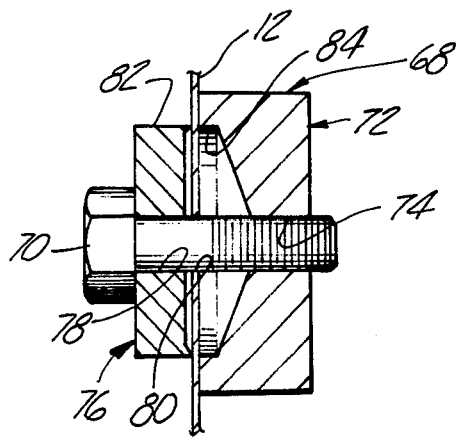
FIG. 4 shows a sectional view of a cutting tool installed on the filter assembly enclosure for cutting the opening shown in FIG. 2 for installing the depicted air valve apparatus therein.

The air valve apparatus 24 can be installed in the side of the enclosure 12 of the filter assembly 10 in any suitable way. One way, of course, is by a stamping or punching operation to provide the proper size hole 66 in the enclosure 12 during its fabrication. The installation with an existing enclosure 12 can be convenientily done with the enclosure 12 in place by use of the cutting tool 68 illustrated in FIG. 4. The cutting tool 68 includes a threaded bolt 70, a female die 72 provided with a threaded hole 74 and a male die 76 having a bolt hole 78.

To start cutting the hole 66, it is first necessary to drill a hole 80 in the enclosure 12 of a size adequate for the bolt 70 to pass therethrough to the inside of the enclosure 12. Then the bolt 70 is passed through the hole 78 in the male die and the hole 80 in the enclosure 12 so as to hold the male die 76 in the viewed FIG. 4 position. Next the female die 72 is positioned on the inside of the enclosure 12 so that the bolt 70 can be threaded into the threaded hole 72 in the female die. The bolt 70 is now tightened so that the dies 72 and 76 move together and their respective cutting edges 82 and 84 sever the enclosure 12 and provide the hole 66 for reception of the air valve apparatus. The size of this hole 66 is such that there is a press fit with the outer surface of the cylindrical portion 50 of the valve section 30. The air valve apparatus 24 can now be inserted until securely in place with the gasket 26 to provide a seal between the air valve apparatus 24 and the side of the enclosure 12 to prevent any leakage of air that might otherwise occur in some instances.

In operation when one or more of the air valve apparatuses 24 are installed in the air filter assembly 10 and the internal combustion engine with which the filter assembly 10 is used is operating, air will be drawn into the engine by way of an air inlet 20. At idle and low speeds and also reduced engine loads, the air valve apparatuses 24 are calibrated so as to close. But upon acceleration of the engine above a certain rate or when a certain engine load is exceeded the engine air requirements will correspondingly increase. Hence, each of the two depicted air valve apparatus 24 in the FIG. 1 embodiment will open because the increased air suction will cause the control 36 to become operative and the suction acting on the valve element 34 will overcome the resistance of the coil spring 38. Therefore, additional air is made available during these peak demand periods.

This increased air flow to the engine from the air valve apparatuses 24 has been determined to substantially increase the gas mileage, particularly during city driving when there are many stops and starts, including city expressway driving or the equivalent where the speed varies between 35 and 55 miles per hour. At higher speeds, there is still an increase in the gas mileage obtained, however, one must be mindful that wind resistance and its influence on gas mileage increases very rapidly as vehicle speed is increased. It has also been determined from tests that not only is the efficiency of the engine increased by way of providing increased gas mileage but also there are no significant changes in the emissions of objectional gases from those vehicles with emission systems. Then too, as has been explained the air valve apparatus 24 by its unique construction resulting in the venturi effect and the twirling effect is self-cleaning and thus eliminates any problem of dirt accumulation interfering with the operating of the air valve apparatus 24. Hence, there is no maintenance problem.

Figure 5:
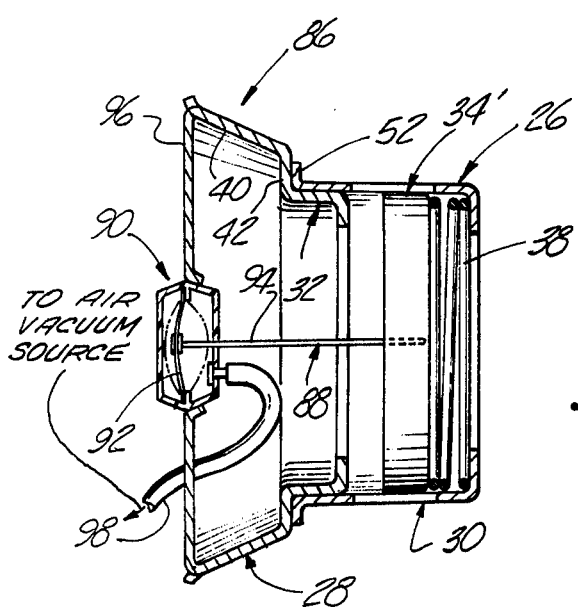
FIGS. 5 and 6 are sectional views of modifications of the FIG. 3 air valve apparatus wherein controls that include a motor positioned on the inlet side of the apparatus are employed for operating the air valve apparatus.
Figure 10:
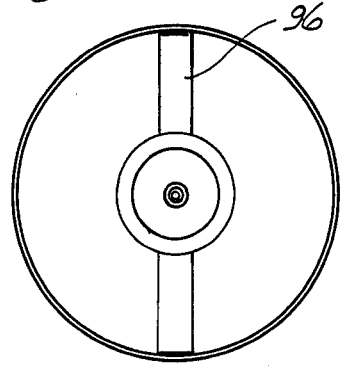
FIG. 10 is an end elevational view of a support bracket for the FIG. 6 motor as seen when looking in the direction of arrows 10—10 in FIG. 6.

The FIG. 5 embodiment of the air valve apparatus is substantially the same as that shown in FIG. 3 except that the FIG. 5 apparatus which is assigned the numeral 86 has a different control designated generally by the numeral 88. The control 88 includes in addition to the spring 38, which urges the valve element 34 towards its closed position, a motor 90 having a flexible diaphragm 92 connected by a link or rod 94 to the valve element 34. The motor 90 is held in place within the opening of the enlarged section 28 by a bracket 96, which as viewed in FIG. 10 is appropriately attached both to the motor 90 and the bell shaped portion 40 in any well known manner, such as by welding. The motor 90 is structually completed by a hose or conduit 98 that extends from the right side of the motor 90, as viewed in FIG. 5, to the source of air vacuum, such as into the interior of the air filter assembly 10 and in the proximity of its outlet opening 22 so that the motor 90 responds to the air suction and any increase will cause the flexible diaphragm 92 to be moved rightwardly to its broken line open position against the opposition of the coil spring 38 at some selected air suction quantity. When this air suction decreases below this selected quantity the coil spring 38 for the control 88 will return the air valve element 34 to its FIG. 3 closed position. The FIG. 5 valve element 34' is different from that described in FIG. 3 since the dome portion 64 has been omitted. Therefore, the opening 58 in the valve section 30 can also be omitted. This domeless valve element 34' is illustrated merely to show that if the application of the air valve apparatus 86 is limited in space then the dome portion 64 can be omitted. Any beneficial twirling effect the dome portion 64 contributes towards the self-cleaning feature would, of course, become unavailable.

Figure 6:
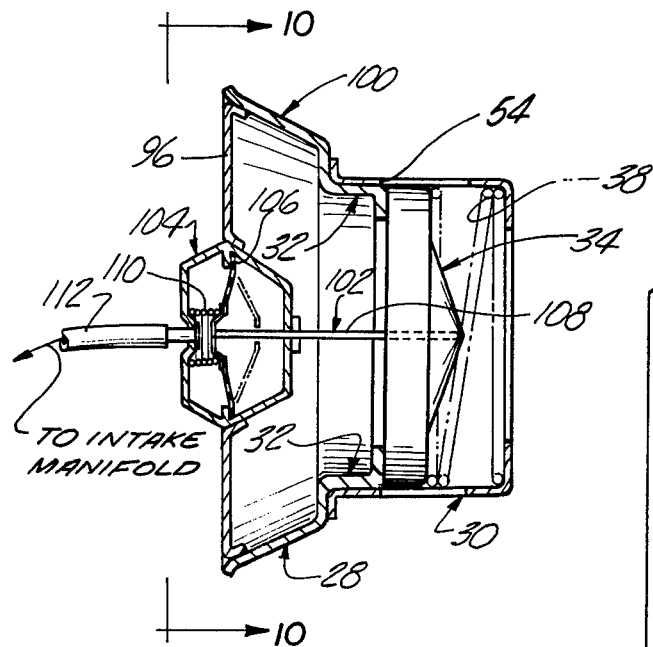

The FIG. 6 modification of the air valve apparatus has been assigned the numeral 100 and includes a still different control denoted generally by the numeral 102. This control 102 includes a motor 104 having a flexible diaphragm 106, which is attached to a link or rod 108 in turn connected to the valve element 34. The motor 104 has a coil spring 110 that acts on the flexible diaphragm 106 and urges the flexible diaphragm 106 and accordingly the valve element 34 from its depicted closed position. The motor 104 is held in place within the opening of the enlarged section 28 by the bracket 96 as viewed again in FIG. 10 in the same way as the motor 90 in FIG. 5. The motor 104 further includes a hose or conduit 112 which connects the interior of the motor 104, specifically the left side of the diaphragm 106 as viewed in FIG. 6, to the intake manifold of the engine (not shown) so as to be subjected to intake manifold vacuum. This connection can be made, as those versed in the art are well aware to other than the intake manifold; e.g., downstream from the carburetor throttle valve, to obtain the same vacuum pressure that approaches atmospheric pressure as the engine load is increased by increasing acceleration or increasing speed, etc. When the intake manifold vacuum decreases; i.e., approaches atmospheric pressure, the spring 110 will urge the flexible diaphragm 106 to the broken line position and correspondingly the valve element 34 to its open position. Thus, the vacuum pressure acting on the motor 104 acts in exactly the opposite way that the air suction acts on the motor 90 in the FIG. 5 embodiment; i.e., with increased demands on the engine; for example, for increased acceleration, the air suction increases in the FIG. 5 embodiment, whereas the intake manifold suction becomes less as it approaches atmospheric pressure in the FIG. 6 embodiment. If wanted, in this FIG. 6 embodiment, the coil spring 38 can be included for calibration purposes.

Figure 7:
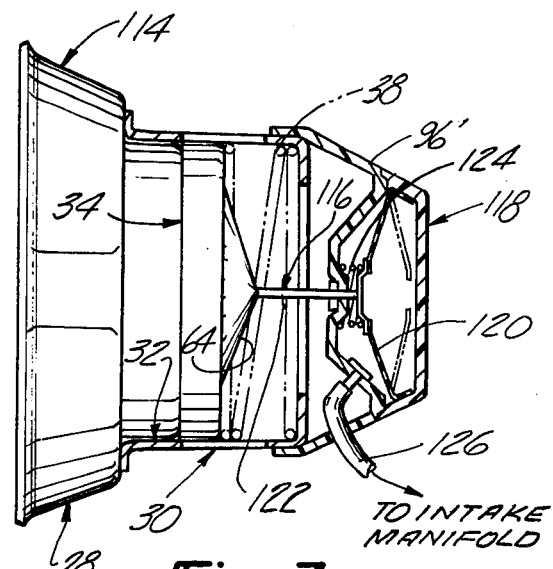
FIGS. 7, 8 and 9 are side elevational views in section of further modifications of the FIG. 3 air valve apparatus wherein controls that include a motor are mounted on the outlet of the apparatus for operating the air valve apparatus.

The modified air valve apparatus construction in FIG. 7 is assigned generally the numeral 114 and includes a control denoted generally by the numeral 116 comprising a motor 118 with a flexible diaphragm 120, connected by a link or rod 122 to the rear end of the dome shaped portion 64 of the valve element 34. The motor 118 also includes a coil spring 124 which urges the flexible diaphragm 120 from its solid line position and a hose or conduit 126 which communicates with the left side of the motor 118 and also with the source of intake manifold pressure. The motor 118 is mounted on the side of the air valve apparatus 114 that extends into the air filter assembly 10 and is held in position by a bracket denoted at the numeral 96', which is similar to bracket 96 and can be formed as a part of the motor 118 or suitably attached to it and the valve section 30 as by welding or in some other well known way. With this construction the flexible diaphragm 120 is held in its solid line position with the valve element 34 also held in its closed position whenever the intake manifold vacuum pressure is at some selected negative value with respect to atmospheric pressure. Again, when the load on the engine increases because of the demand for acceleration, the intake manifold pressure approaches atmospheric pressure and therefore, the coil spring 124 will urge the flexible diaphragm 120 towards its broken line position and, therefore, move the valve element 34 to its open position to allow more air to enter by way of the air valve apparatus 114 to the air filter assembly 10. If desired, the coil spring 38 can also be included in the FIG. 7 embodiment for calibration purposes.

Figure 8:
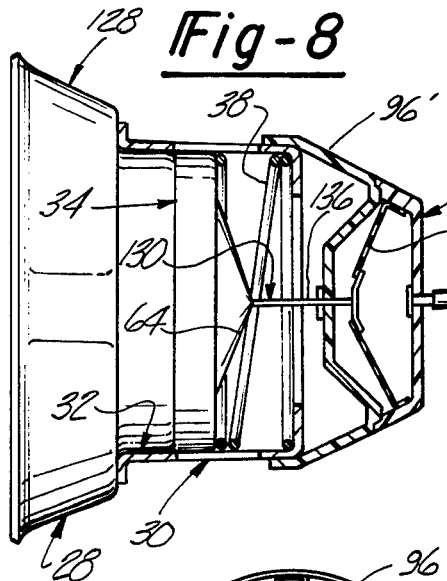

In FIG. 8, still another modification of the FIG. 3 air valve apparatus is shown and has been assigned generally the numeral 128. A control for the air valve apparatus 128 is shown generally at 130 and includes a motor 132 which is connected to the end of the apparatus 128 that extends into the air filter assembly 10 by the mentioned FIG. 7 bracket 96'. This control 130 performs much in the same way as the motor 90 in FIG. 5 except for its location. The motor 132 includes a flexible diaphragm 134 connected by a link or rod 136 to the dome shaped portion 64 of the valve element 34. A hose or conduit 138 communicates with the right side of the motor 132 as viewed in FIG. 8 and extends to the air suction source in the same way as the conduit 98 in the FIG. 5 modification so that when the demand for air is reflected in an increase in the air suction, the flexible diaphragm 134 is moved rightwardly in FIG. 8 against the opposition from the bias spring 38 and the valve element 34 will move from its viewed closed position to its open position.

Figure 9:
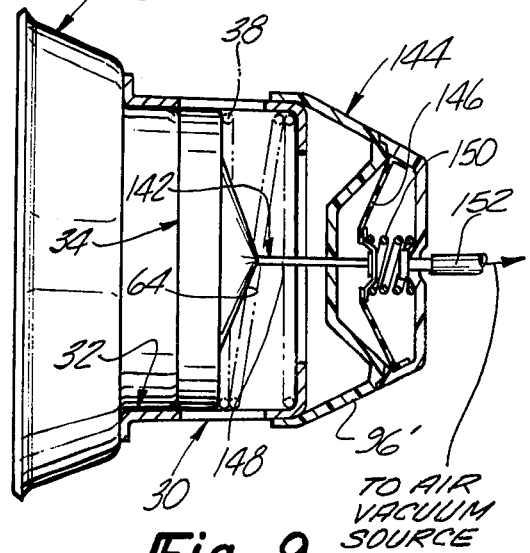

Finally, in FIG. 9 a modified air valve apparatus denoted generally at 140 is illustrated which is similar to that in FIG. 8. This apparatus 140 has a motor 144 provided with a flexible diaphragm 146 that is connected by a link or rod 148 to dome shaped portion 64 of the valve element 34 and a coil spring 150 which urges the diaphragm 146 and the valve element 34 to its illustrated position. The motor 144 has a hose or conduit 152 that is similar to the hose or conduit 138 in the FIG. 8 embodiment and extends to the air vacuum source which in this embodiment is the interior of the air filter assembly 10 and specifically, the proximity of the outlet opening 22. It will be noted in comparing FIGS. 8 and 9 that the spring 150 urges the valve element 34 to the closed position, whereas in FIG. 8 the coil spring 38 performs this function. If desired, the coil spring 38 can be included in the FIG. 9 modification to provide increased bias if necessary or for calibration purposes.

The various embodiments are intended to show that the control can rely; e.g., as in FIG. 8, upon the flexible diaphragm 134 in the motor 132, when used, a coil spring within the motor, as the coil spring 150 in the FIG. 9 apparatus or the coil spring 38 separately or together with the motor spring or diaphragm. Furthermore, as will be appreciated the air valve apparatuses illustrated including that in FIG. 3 and the modifications in FIGS. 5 through 9 permit the admission of additional air to a vaccum source which, for illustration purposes, was an internal combustion engine but they are not limited to such.

Also one should be mindful that one or more of the air valve apparatuses 24 can be used. This will be determined by the application and the type of vacuum source the filter assembly 10 is used with, keeping in mind that the apparatuses 24 can be used with other than internal combustion engines as those versed in the art will appreciate. Also when one or more apparatuses 24 is used, their controls can be calibrated so that they open at different accelerations and loads.

As will be now appreciated air valve apparatus is provided for admitting additional air to a vacuum source in accordance with demand but without either altering existing emission systems or increasing undesired emissions. The installation is quick and simple since each apparatus is provided with the FIG. 4 cutting tool so that a do-it-yourself installation can be made with the filter assembly 10 in place on the engine carburetor. There the apparatus is relatively maintenance free because of the self-cleaning feature.

The invention is to be limited only by the following claims.

The embodiments of the invention in which an exclusive property or privilege is claimed are defined as follows:

1. In an air filter assembly for an air vacuum source such as an internal combustion engine, the filter assembly including filter means and an enclosure for the filter means, the enclosure having an air inlet and an air outlet extending through the filter means to the air vacuum source whereby the filter means filters the air passing therebetween, air valve apparatus supported by the enclosure for permitting ingress of additional air through the filter means to the air vacuum source under certain vacuum source conditions, the air valve apparatus including a housing supported by the enclosure and having an enlarged section provided with an open end communicating with the exterior of the enclosure, a valve section having an outlet opening therein communicating with the interior of the filter assembly and arranged relative to the filter means so that the air existing from the outlet opening passes through the filter means, a reduced section between the enlarged section and the valve section and the valve section, a cup shaped valve element having the open end thereof facing the enlarged section open end and being movable within the housing between open and closed positions relative to the outlet opening, and control means for the valve means operative in response to the certain vacuum source conditions to cause the valve means to be moved from the closed position to the open position.

2. An air filter assembly as described in claim 1, wherein the enlarged section is bell shaped with a relatively large open end and the reduced area section comprises a smaller opening adjacent the enlarged opening so as to produce the venturi effect.

3. Air filter assembly as described in claim 1, wherein the valve section includes a cylindrical portion having and open end in the cylindrical portion communicating with the reduced area section of the housing and at the other end inwardly extending flanges defining an opening therethrough, and outlet opening means includes a series of spaced apart slots in the periphery of the cylendrical portion of the valve section.

4. An air filter assembly as described in claim 1, wherein the air valve element is cup shaped and has an annular flange defining an opening that faces the open end of the enlarged section of the housing and is arranged so that the annular flange facilitates cleaning the air valve apparatus.

5. An air filter assembly as described in claim 1, wherein the valve element is provided with an annular flange defining an opening extending towards the open end of the enlarged section of the housing and a dome shaped recess in the end of the valve element opposite the opening therein so that the dome shaped part and the annular flange combine to facilitate cleaning of the air valve apparatus.

6. An air filter assembly as described in claim 1, wherein the control means includes a motor having a diaphragm coupled to the air valve element and is arranged to communicate with the air vacuum source so that when the suction is increased the motor diaphragm will move air valve element to the open position thereof.

7. An air valve assembly as described in claim 1, wherein the control means includes motor means arranged on the enlarged section of the housing, the motor means having a flexible diaphragm connected to the air valve element and communicating with the air vacuum source, bias means arranged so as to urge the air valve element to the open position thereof when the suction acting on the flexible diaphragm of the motor means attains one certain value and the bias means is overcome when the suction acting on the flexible diaphragm of the motor means attains another certain value so that the valve element is urged to the closed position.

8. An air valve assembly as described in claim 1, wherein the control means includes motor means arranged on the end of the air valve section at the end opposite the open end of the enlarged section, the motor means having a flexible diaphragm connected to the air valve element and communicating with the air vacuum source, bias means arranged so as to urge the air valve element to the open position thereof when the suction acting on the flexible diaphragm of the motor means attains one certain value and the bias means is overcome when the suction acting on the flexible diaphragm of the motor means attains another certain value so that the valve element is urged to the closed position.

9. An air filter assembly as described in claim 1, wherein the control means includes motor means arranged in the housing and having a flexible diaphragm connected to the air valve element and bias means arranged to urge the air valve element to the closed position, the motor being connected to an air vacuum source so that when the air suction is of a certain magnitude the bias means is overcome and the air valve element moved to its open position.

10. An air filter assembly as described in claim 1, wherein the control means includes a spring urging the valve element to the closed position.

11. An air filter assembly is described in claim 10, wherein the control means includes motor means arranged on the enlarged section of the housing and a diaphragm coupled to the valve element and the motor means is arranged to communicate with the air vacuum so that when suction attains a predetermined amount the bias from the spring and diaphragm will be overcome and the air valve element moved to the open position thereof.

12. An air valve assembly as described in claim 1, wherein the control means includes motor means arranged on the housing and having a flexible diaphragm connected to the air valve element and communicating with the air vacuum source, bias means arranged so as to urge the air valve element to the open position thereof when the suction acting on the flexible diaphragm of the motor means attains one certain value and the bias means is overcome when the suction acting on the flexible diaphragm of the motor means attains another certain value to that the valve element is urged to the closed position.

13. An air filter assembly as described in claim 12, wherein the air vacuum source is an internal combustion engine and the suction pressure corresponds to that from the intake manifold thereof so that the suction approaches atmospheric pressure when the engine is under heavy load or during acceleration.

14. An air valve assembly as described in claim 12, wherein the bias means includes a spring positioned within so as to act on the diaphragm thereof.

15. An air valve assembly as described in claim 14, wherein the bias means further includes a spring positioned within the air valve section so as to urge the valve element to the closed position.

16. An air filter assembly as described in claim 1, wherein the control means includes motor means arranged in the end of the air valve section at the end opposite the open end of the enlarged section, the motor having a flexible diaphragm connected to the air valve element and bias means arranged to urge the air valve element to the closed position, the motor being connected to an air vacuum source so that when the air suction is of a certain magnitude the bias means is overcome and the air valve element moved to its open position.

17. An air filter assembly as described in claim 16, wherein the bias means includes a spring positined within the motor so as to act on the diaphragm thereof.

18. An air filter assembly as described in claim 16, wherein the bias means includes a spring positioned within the air valve section so as to urge the valve element to the closed position.

19. In an air filter assembly for an air vacuum source such as an internal combustion engine, the filter assembly including filter means and an enclosure for the filter means having an air inlet and an air outlet extending through the filter means to the air vacuum source, air valve apparatus supported by the enclosure for permitting ingress of additional air to the air vacuum source under certain conditions, the air valve apparatus including a housing supported by the enclosure and having an enlarged bell section provided with a relatively large opening and communicating with the exterior of the enclosure, a valve section having cylindrical portions with a series of spaced apart openings therein communicating with the interior of the enclosure and arranged relative to the filter means so that the air exiting from the outlet openings passes through the filtering means, a reduced section between the enlarged section and the valve section and operative to combine with the enlarged section to provide a venturi effect upon the air flowing therethrough, the cylindrical portion having an open end communicating with the reduced section and at the other end inwardly extending flanges defining an opening therethrough, a valve element slideable within the valve section between open and closed positions relative to the openings in the valve section, the valve element being cup shaped and having an annular flange defining an opening arranged to face the open end of the enlarged section and an opposite closed end with a dome shaped portion for cooperating with the annular flange and the venturi effect to provide self cleaning, and control means maintaining the valve element in the closed position thereof and op-

UNITED STATES PATENT OFFICE
CERTIFICATE OF CORRECTION

Patent No. 3,877,908          Dated April 15, 1975

Inventor(s) Harold E. Phelps

It is certified that error appears in the above-identified patent and that said Letters Patent are hereby corrected as shown below:

Column 2, line 1, after "Another" delete "object" and insert --objective--.

Column 2, line 33, after "filter" insert --assembly--.

Column 4, line 11, after "freely" delete "slidably" and insert --slidable--.

Column 5, line 39, after "the" delete "operating" and insert --operation--.

Column 7, line 37, after "illustrated" insert --closed--.

Column 9, Claim 11, line 54, after "vacuum" insert --source--.

Column 10, Claim 12, line 2, after "value" delete "to" and insert --so--.

Column 10, Claim 19, line 45, after "bell" insert --shaped--.

Signed and Sealed this twenty-second Day of July 1975

[SEAL]

Attest:

RUTH C. MASON
Attesting Officer

C. MARSHALL DANN
Commissioner of Patents and Trademarks